United States Patent [19]

Terashi

[11] Patent Number: 5,177,725
[45] Date of Patent: Jan. 5, 1993

[54] SERVO APPARATUS WITH AN EXPANDED PULL-IN RANGE

[75] Inventor: Hiroto Terashi, Kagoshima, Japan

[73] Assignee: Asahi Kogaku Kogyo K.K., Tokyo, Japan

[21] Appl. No.: 553,842

[22] Filed: Jul. 18, 1990

[30] Foreign Application Priority Data

Jul. 18, 1989 [JP] Japan .................................. 1-185716

[51] Int. Cl.⁵ .............................................. G11B 7/00
[52] U.S. Cl. ............................. 369/44.29; 369/44.27; 369/44.35; 369/124
[58] Field of Search .................... 369/44.29, 32, 44.32, 369/44.27–44.28, 44.35, 124; 360/78.01, 73.03

[56] References Cited

U.S. PATENT DOCUMENTS 4,724,369  2/1988  Hashimoto ...................... 360/78.01
5,048,001  9/1991  Moriya et al. .................... 369/44.32

Primary Examiner—Tommy P. Chin
Assistant Examiner—Robert Chevalier
Attorney, Agent, or Firm—Sughrue, Mion, Zinn, Macpeak & Seas

[57] ABSTRACT

A servo apparatus capable of detecting a signal which is approximately equal to a true velocity of a driven system. It is therefore possible to expand a servo pull-in-capable region without expanding a servo band, and to prevent an occurrence of cycle slipping occurring.

8 Claims, 4 Drawing Sheets

SIGNAL N1, -N1, Q1, -Q1 c:Q1  a:N1  d:-Q1  b:-N1

OUTPUT OF SW 25

SERVO APPARATUS WITH AN EXPANDED PULL-IN RANGE

BACKGROUND OF THE INVENTION

The present invention relates to a servo apparatus that provides an expanded pull-in capable region to prevent cycle slipping, and it relates particularly to such a circuit which is useful in an optical disk apparatus, PLL circuit or the like.

In a conventional servo apparatus, for example, an optical disk apparatus, as shown in FIG. 2.

The servo apparatus includes: a subtracter 1 for subtracting an output signal of an adder 4, from an input signal so as to supply the result of subtraction to a system 2 to be driven; an adder 6 which is provided to assume that a disturbance is added to the output of the system 2; an encoder 3 for converting the output of the adder 6 into an electric signal; and a differentiation circuit 5 for differentiating the output of the encoder 3, the respective outputs of the encoder 3 and the differentiation circuit 5 being added to each other in the adder 4.

More specifically, a system which corresponds to the system 2, is constituted by a tracking actuator in an optical disk reproducing apparatus, for instance. The tracking actuator 2 is driven in accordance with an input signal so as to move a light beam in a direction perpendicular to the tracks of an optical disk (not shown here). An amount X of movement of the light beam is converted to an electric signal by a pick-up. In this case, however, there may not be a linear relationship between the converted electric signal and the movement amount X, but there may occurs frequent variation therebetween. The variation is approximately expressed as a sine wave (sin X). Accordingly, the pickup can be regarded as the encoder 3.

The output of the encoder 3 is applied to the differentiation circuit 5 where it is differentiated, and a velocity (cosx) of the light beam is produced from the differentiation circuit 5. The respective outputs of the encoder 3 and the differentiation circuit 5 are added to each other in the adder 4 and the output of the adder 4 is applied to the subtracter 1.

The subtracter 1 subtracts the output of the adder 4 from the input signal and supplies the result of subtraction to the system 2.

Thus, closed loop phase advance compensation is performed by the differentiation circuit 5, which makes it possible to accurately and stably operate a servo system for following the light beam to a destination track.

As described above, in the conventional servo apparatus, a velocity component of the light beam is obtained by differentiating the output of the encoder 3 by means of the differentiation circuit 5. Indeed, the output (cosx) of the differentiation circuit 5 substantially corresponds to the velocity of the output (x) of the system 2, that is, the movement speed of the light beam, in the linear operation area, that is, in a area where the variation X is relatively small, after the servo is pulled in. However, before the servo is pulled in, in a non-linear operation area where the variation X is relatively large, the output (cosx) cannot be a true velocity component (dx/dt) of the output (x) from the system 2, but is instead a signal which is obtained by differentiating the output (sinx) of the encoder 3. As a result, the servo pull-in-capable region is so narrow that cycle slipping is apt to occur.

This will be further described with reference to FIG. 3. In the case where the servo apparatus in FIG. 2 is further subjected to phase place analysis, the output of the encoder 3 is a periodic function with respect to the variation X and the system 2 is a second order system as shown in FIG. 3 In FIG. 3, the abscissa and ordinate express the position x of the light beam and the movement velocity thereof, respectively. In FIG. 3, a group of curves represent loci of the light beam which indicate variation in the position and movement velocity of the light beam in the case where the disturbance x is intentionally applied to cause the position of the light beam and the movement velocity thereof to vary forcibly. The positions which are designated by integers on the abscissa of FIG. 3 represent the track positions. That is, the track positions are designated by $-2, -1, 0, 1, 2$ and the like. As mentioned above, the ordinate indicates the movement velocity of the light beam. When the movement velocity is of positive, the light beam moves along the locus in a direction where the position number X increases, that is the light beam moves from left to right in FIG. 3. On the other hand, when the movement velocity is of negative, the light beam moves along the locus in a direction where the position number X decreases, that is the light beam moves from the right to left in FIG. 3. For example, assuming that the light beam tracing on the track 0 is caused by a disturbance Xd to forcibly shift to a position A which is defined by a position $-1.5$ and a velocity 1.0 in FIG. 3, thereafter, the light beam starts moving from the position A as a start position and tracing the locus rightwordly with variation in the movement velocity. However, since the movement velocity is maintained positive even when the light beam arrives at the right-most side of FIG. 3, no light beam is focused on any tracks in FIG. 3. Next, assuming that the light beam is forcibly shifted to a position B due to the disturbance Xd, the light beam traces the locus rightwardly from the position B and then the light beam is focused on the track $-2$. This results in pulling the light beam in the track $-2$.

As is apparent from FIG. 3, in order to stop the pickup on a track at the position O, it is preferable to turn a servo loop on at the position $-0.25$ (the position preceding the position O by the pitch 0.25). The reason for this is that at this position C the velocity becomes equal to about 0.75, and it is only possible to accurately stop the pickup on the track at the position O if the velocity is not more than 0.75.

If the servo loop is turned on at the position (in the left side in FIG. 3) preceding the position $-0.25$, cycle slipping is caused even if the velocity is smaller than 0.75, which causes the pickup to move to a track (in the right side in FIG. 3) beyond the position O.

The pull-in-capable region could be expanded if the servo band is expanded, but this would result in the servo band being expanded beyond necessity.

SUMMARY OF THE INVENTION

It is therefore an object of the present invention to solve the foregoing problems of the prior art.

It is another object of the present invention to provide a servo apparatus in which a servo pull-in-capable region is expanded without expanding the servo band and to prevent the occurrence cycle slips.

According to the present invention, the servo apparatus comprising: a driven means for producing an output representing variation in position of said driven means in response to an input signal representing a desired position thereof; a position detecting means for outputting an electric signal corresponding to the variation; a velocity detecting means for detecting a movement velocity of said driven means to output an electric signal representing the detected velocity; means for subtracting the electric signals output by said position detecting means and said velocity detecting means from the input signal to produce an output signal to be applied to said driven means, a plurality of outputs from said position detecting means, which have a predetermined phase difference with respect to each other, being employed as the input of said velocity detecting means to thereby expand a servo pull-in-capable range.

Further, a signal which is approximately equal to a true velocity of a driven system is detected. It is therefore possible to expand the servo pull-in-capable region without expanding the servo band, and to prevent the occurrence of cycle slipping.

BRIEF DESCRIPTION OF THE DRAWINGS

These and other features and advantages of the present invention will become more apparent from the following description taken in conjunction with the accompanying drawings, wherein.

DETAILED DESCRIPTION OF THE PREFERRED EMBODIMENT

Figure 1:
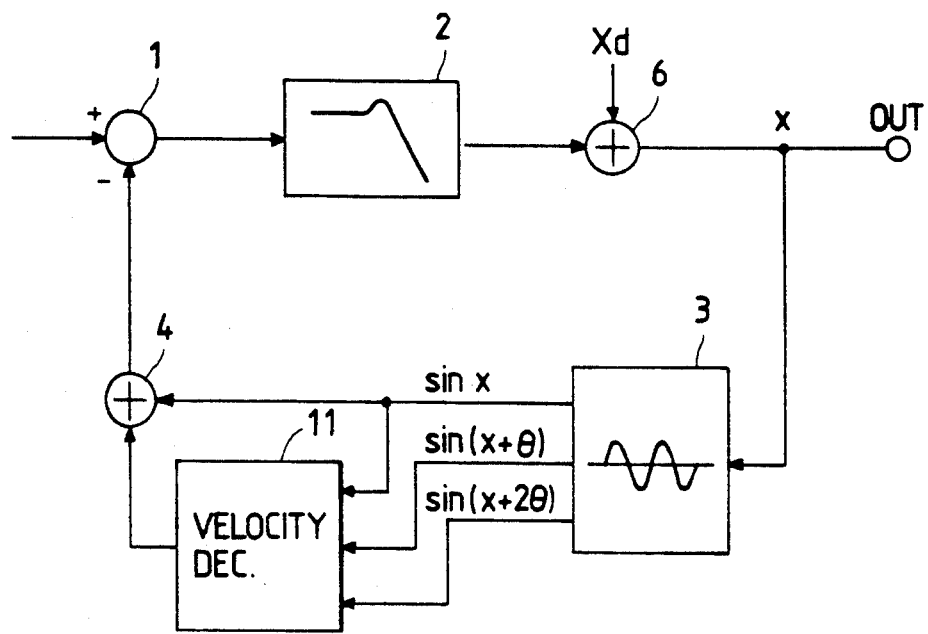
FIG. 1 is a block diagram for explaining the principle of the servo apparatus according to the present invention.
Figure 2:
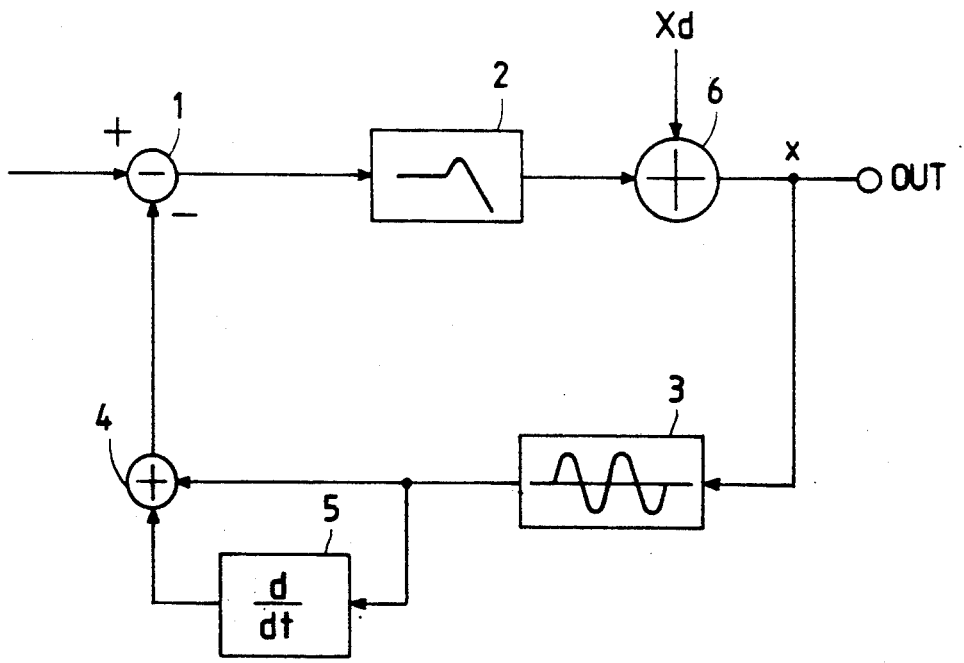
FIG. 2 is a block diagram illustrating the configuration of an example of a conventional servo apparatus.
Figure 3:
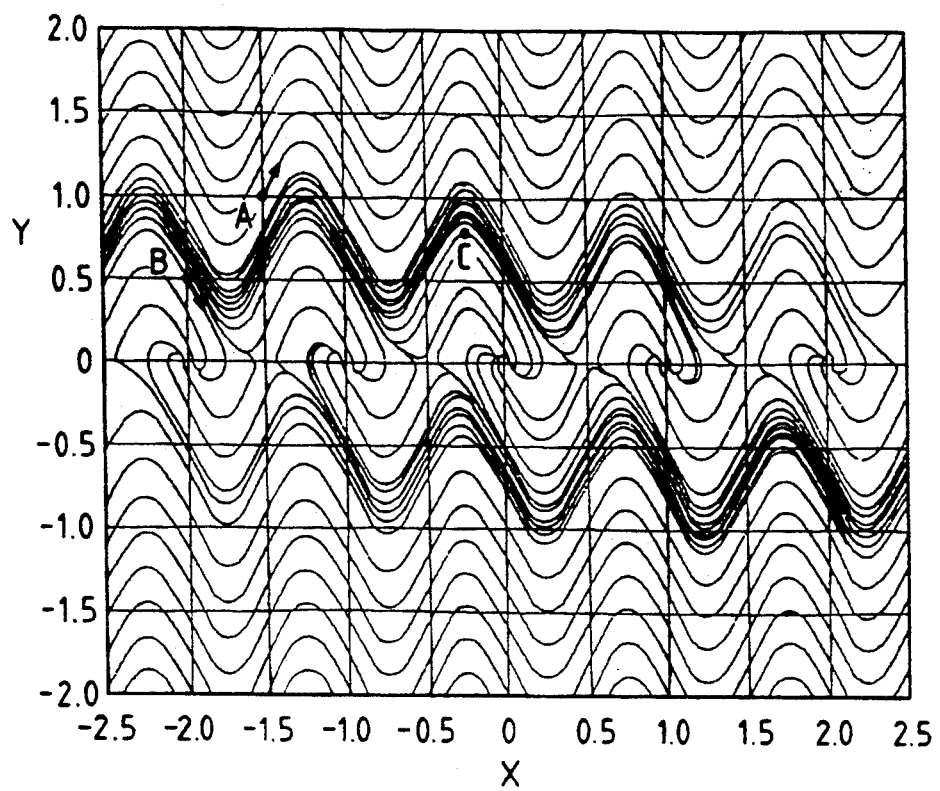
FIG. 3 is a phase plane analysis diagram of the apparatus depicted in FIG. 2.

FIG. 1 is a block diagram for explaining the principle of the servo apparatus according to the present invention, and in FIG. 1, parts the same as or equivalent to those in FIG. 2 are referenced correspondingly. The reference numeral 11 represents a velocity detecting means for detecting a signal approximately equal to a true velocity of a position x and for supplying the detected true velocity component to an adder 4.

Figure 4:
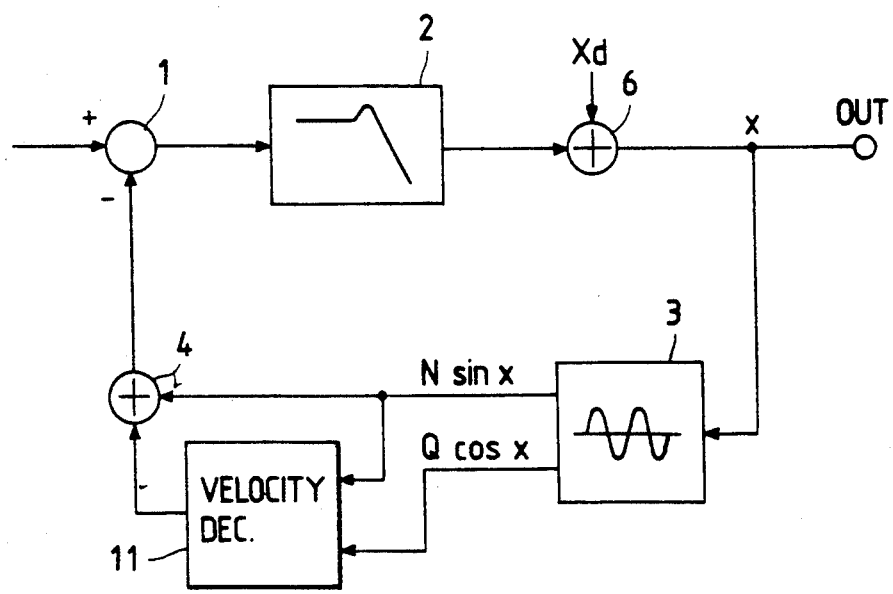
FIG. 4 is a block diagram illustrating the configuration of a first embodiment of the servo apparatus according to the present invention.

FIG. 4 is a block diagram illustrating the configuration of an embodiment of the servo apparatus according to the present invention. In FIG. 4, parts the same as or equivalent to those in FIG. 1 are referenced correspondingly. As shown in FIG. 4, an encoder 3 produces a signal N and a signal Q which has a phase advanced by 90 degrees with respect to the signal N. Both signals N and Q are supplied to a velocity detection device 11 that detects a velocity component on the basis of these signals N and Q. The signal N and the output of the velocity detection means 11 are combined in an adder 4.

Figure 5:
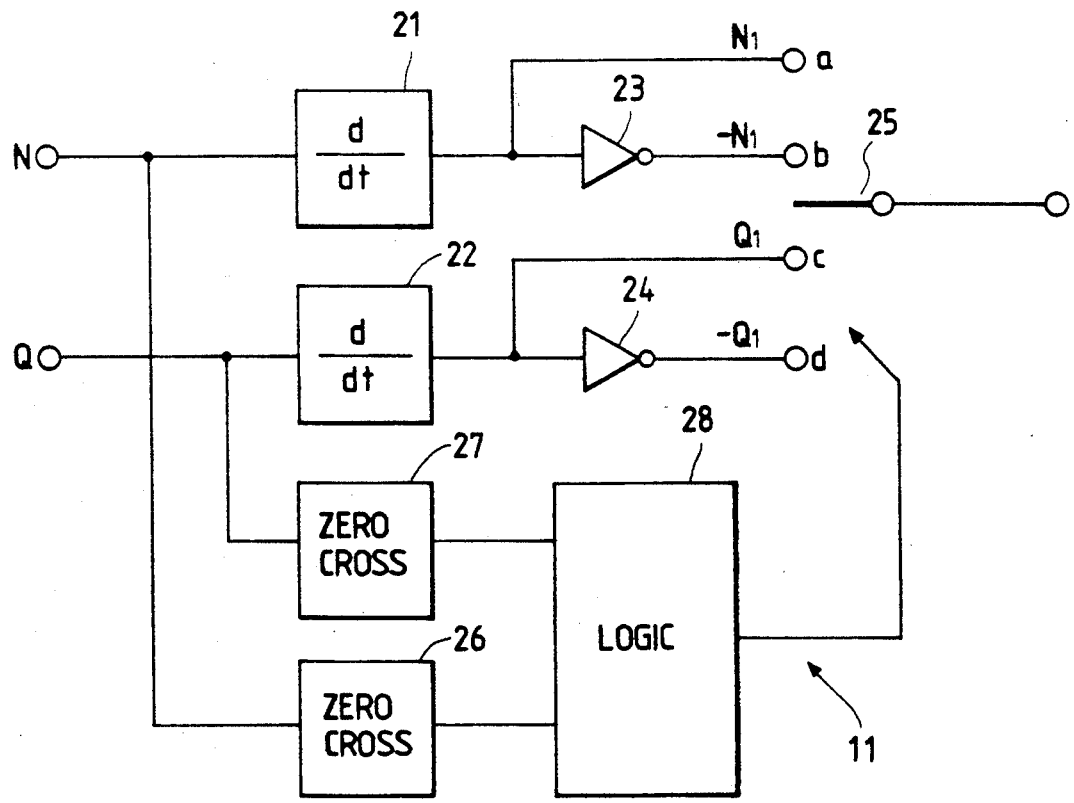
FIG. 5 is a block diagram illustrating the configuration of an embodiment of the velocity detecting means depicted in FIG. 4.

FIG. 5 is a block diagram illustrating the configuration of a specific embodiment of the velocity detection means 11 in FIG. 4. In FIG. 5, the velocity detection means 11 includes: differentiation circuits 21 and 22 for differentiating the signals N and Q, respectively; inverters 23 and 24 for inverting the outputs of the respective differentiation circuits 21 and 22; a switch 25 for selecting either one of non-inverted output signals of the differentiation circuits 21 and 22 and the inverted output signals of the same through the inverters 23 and 24, respectively, for applying the selected signal to the adder 4 of FIG. 4; zero crossing detection circuits 26 and 27 for detecting zero crossings of the signals N and Q, respectively; and a logical operation circuit 28 for producing a control signal for changing over the switch 25 in response to the detection signals supplied from the zero crossing detection circuits 26 and 27.

Figure 6:
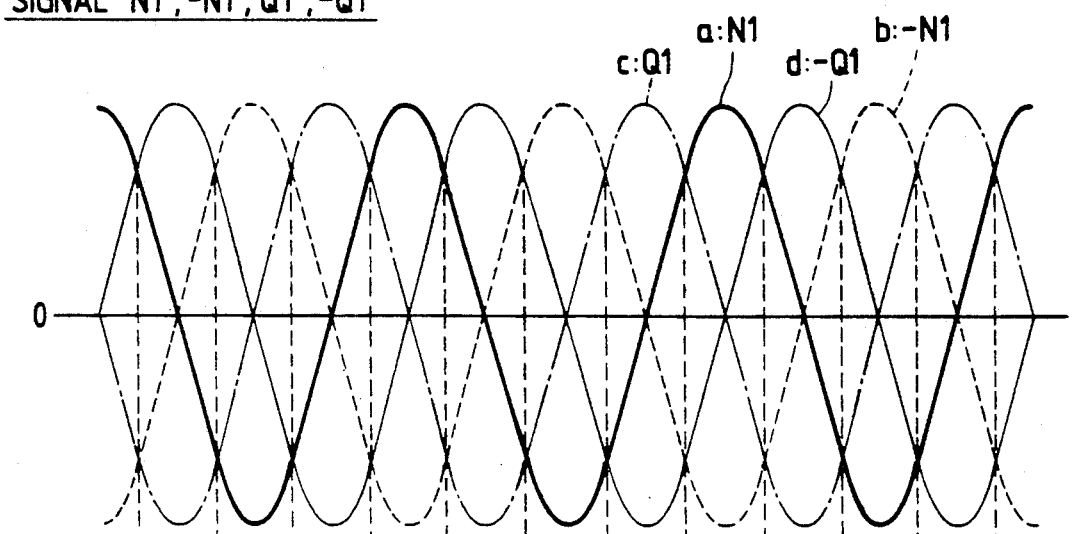
FIG. 6 is a waveform diagram for explaining the operation of the velocity detecting means depicted in FIG. 5.
Figure 6:
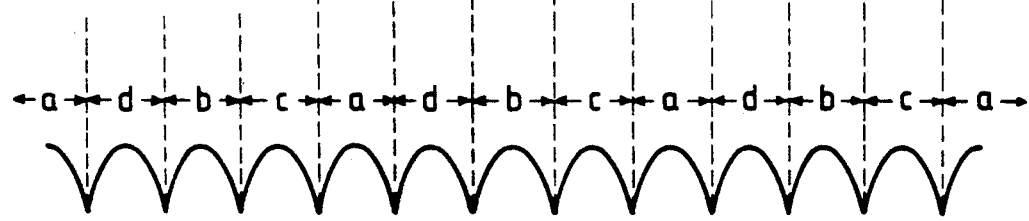

The operation of the preferred embodiment will be described with reference to a waveform diagram shown in FIG. 6, hereunder.

The driven system 2 which is constituted by a tracking actuator, for example, is driven in accordance with an input signal supplied to it. A light beam is driven in the direction perpendicular to tracks of an optical disk. The encoder 3 produces a voltage signal sinx (signal N) corresponding to the position x of the light beam. This voltage sinx is applied to both the adder 4 and the velocity detection device 11.

The encoder 3 produces a signal Q (cosx) having a phase advanced by 90 degrees with respect to the signal N (sinx), and the signal Q (cosx) is supplied to the velocity detection device 11.

In the velocity detection device 11, the signal N (sinx) is differentiated by the differentiation circuit 21 and then supplied to a terminal a of the switch 25 as a signal N1 (cosx). At the same time, this differentiated signal N1 is inverted by the invertor 23, and supplied to a terminal b of the switch 25 as a N1 signal ($-\cos x$). In the same manner, the signal Q (cosx) is differentiated by the differentiation circuit 22, and supplied to a terminal c of the switch 25 as a signal Q1 ($-\sin x$). At the same time, this differentiated signal Q1 is inverted by the invertor 24, and supplied to a terminal d of the switch 25 as a signal $\overline{Q1}$ (sinx) (see FIG. 6).

The zero crossing detection circuits 26 and 27 detect zero crossings of the signals N and Q and supply detection signals to the logical operation circuit 28. The logical operation circuit 28 produces a change-over signal on the basis of the outputs of the zero crossing detection circuits 26 and 27. In response to the change-over signal, the switch 25 is changed over so that a signal having the largest level is selected among the signals on the terminals a through d. Therefore, in this embodiment of the invention, the terminals through d are changed over in the order from the terminal a toward the terminal d through the terminals b and c, so that the signals are put out sequentially in the order of the signals N1, $\overline{Q1}$, $\overline{N1}$ and Q1 (see FIG. 6).

Assuming that the light beam is shifted at a constant velocity, in the direction toward the outer circumference, a periodic signal sinx will be produced from the encoder 3 corresponding to the position of the light beam. The position is detected by counting the number of zero crossings of the signal sinx, or the like.

However, the light beam is driven at a constant velocity at that time, and it is obvious that the velocity does not change periodically as cosx. Thus, the velocity of the light beam should take a constant value of a predetermined polarity (for example, positive). Although the signal put out from the switch 25 is pulsating as shown in FIG. 6, the mean value of the signal is almost constant. Therefore, this signal becomes an approximate value of a true velocity of the pickup at the position x.

The signal thus produced by the velocity detection device 11 is supplied to the adder 4 and added to the signal supplied from the encoder 3. The sum signal is supplied to the subtracter 1 and subtracted from an input signal. The output of the subtracter 1 is supplied to the driven system 2.

In this manner, the velocity detection device 11 functions as a phase advance compensating circuit, so that the pickup is driven stably in the direction perpendicular to the tracks.

Figure 7:
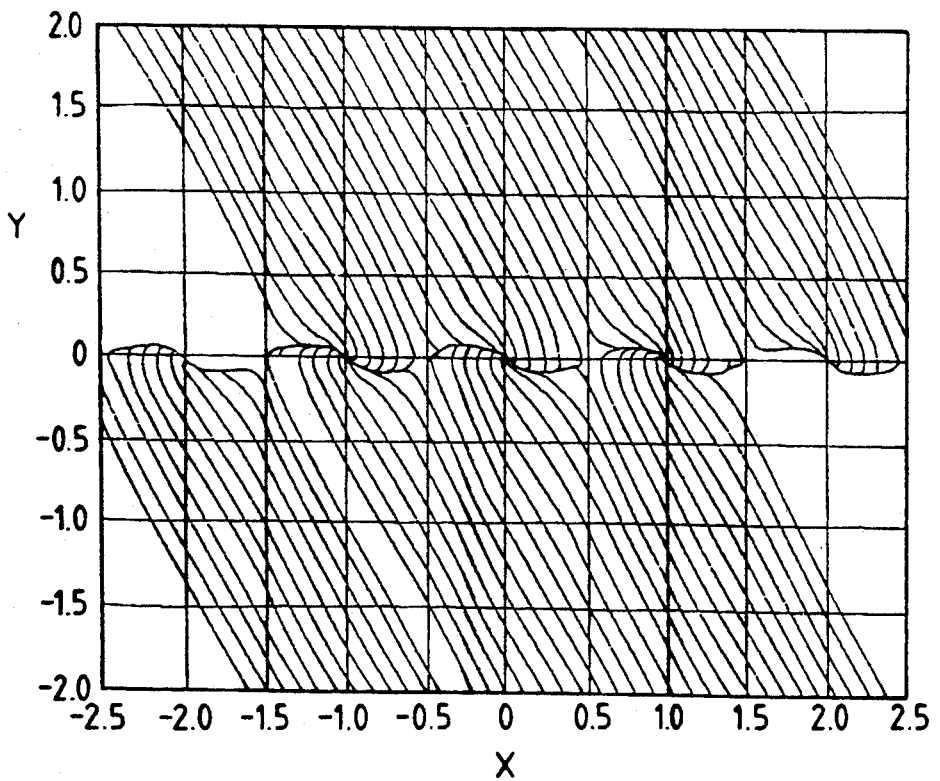
FIG. 7 is a phase plane analysis diagram of the apparatus depicted in FIG. 4.

FIG. 7 is a phase analysis diagram of the embodiment of FIG. 4. As is apparent from FIG. 4, the pull-in-capable region is expanded as compared to a conventional servo apparatus described earlier. For example, in order to stop the pickup on a track at the position O, it is preferred that the servo loop be turned on at the position −0.5, which is the position preceding the position O by the pitch ½, and the velocity is about 1.8. Therefore, even if the velocity at the position −0.25 is twice as fast as that in a conventional servo apparatus, it is possible to stop the pickup on the track at the position O.

In the same manner, a velocity signal may be produced on the basis of three signals which are different in phase from one another by 60 or 120 degrees. In this case, the accuracy is increased as compared to the above embodiment and it is possible to make the velocity approach the true velocity.

Although the output of the encoder 3 is in the form of a sine wave, the output may be made to change in the form of a saw tooth wave so as to make it possible to produce a perfect true velocity component.

The present invention is applicable to other apparatuses, e.g., such as a PLL circuit.

As has been described, in a servo apparatus according to the present invention, a signal approximately equal to a true velocity of a driven subject is reproduced, and the true velocity is subtracted from an input signal, so that it is possible to expand a servo pull-in-capable region without expanding a servo band. Moreover cycling slipping is reduced and high speed access can be performed.

What is claimed is:

1. A servo apparatus comprising:
   a driven means for producing an output representing variation in position of said driven means in response to an input signal representing a desired position thereof;
   a position detecting means for outputting a plurality of position signals having a predetermined phase difference with respect to each other, the position signals corresponding to the variation;
   a velocity detecting means for detecting a movement velocity of said driven means based on the plurality of position signals and outputting an electric signal representing the detected velocity, said velocity determining means comprising:
      a differentiating means for differentiating the plurality of position signals;
      an inverting means for inverting outputs of said differentiating means; and
      a velocity signal selecting means for selecting one of the outputs of said differentiating means and said inverting means having the largest level, to output the electric signal representing the detected velocity; and
   means for subtracting the electric signals output by said position detecting means and said velocity detecting means from the input signal to produce an output signal to be applied to said driven means, wherein said apparatus provides an expanded pull-in-capable range.

2. An apparatus as recited n claim 1, wherein said velocity detecting means further comprises means for detecting zero-crossings of the plurality of position signals to produce a plurality of zero-crossing signals, and wherein said velocity signal selecting means selects one of the outputs of said differentiating means and said inverting means based on the zero-crossing signals.

3. A servo apparatus comprising:
   a driven system for producing an output representing variations in position of said driven system in response to an adjusted input signal representing a desired position thereof;
   an encoder, operatively connected to said driven system, for outputting an encoded variation signal corresponding to the variations in position and for outputting a first phase-shifted encoded variation signal having a predetermined phase difference with respect to the encoded variation signal;
   a velocity detecting device, operatively connected to said encoder, for detecting a movement velocity of said driven system based on the encoded variation signal and the first phase-shifted encoded variation signal output from said encoder to produced a velocity signal;
   an adder, operatively connected to said encoder and said velocity detection device, for adding the velocity signal to the encoded variation signal to produce a summation signal; and
   a subtractor, operatively connected to said adder and said driven system, for subtracting the summation signal from an input signal to produce the adjusted input signal.

4. An apparatus as recited in claim 3, wherein said driven system comprises a tracking actuator in an optical disk recording apparatus.

5. An apparatus as recited in claim 3, wherein said velocity detection device comprises:
   means for differentiating the encoded variation signal and the first phase-shifted encoded variation signal to produce first and second velocity signals, respectively;
   means for inverting the first and second velocity signals to produce third and fourth velocity signals, respectively;
   means for detecting zero-crossings of the encoded variation signal and the first phase-shifted encoded variation signal to produce first and second zero-crossing signals, respectively; and
   means for selecting one of the first through fourth velocity signals as the velocity signal produced by said velocity detection means based n the first and second zero-crossing signals.

6. An apparatus as recited in claim 3,
   wherein said encoder further outputs a second phase-shifted encoded variation signal having the predetermined phase difference with respect to the encoded variation signal, and
   wherein said velocity detection device produces the velocity signal based on the encoded variation signal and the first and second phase-shifted encoded variation signals output from said encoder.

7. An apparatus as recited in claim 6, wherein the predetermined phase difference is 60 or 120 degrees.

8. An apparatus as recited in claim 3, wherein the predetermined phase difference is 90 degrees.

* * * * *